United States Patent
Tee et al.

(10) Patent No.: US 8,605,570 B2
(45) Date of Patent: Dec. 10, 2013

(54) METHOD AND SYSTEM FOR GENERATING A SUPERFRAME PREAMBLE IN AN ORTHOGONAL FREQUENCY DIVISION MULTIPLEXING NETWORK

(75) Inventors: Lai-King Tee, Dallas, TX (US); Mohamed A. El-Rayes, Plano, TX (US); Baowei Ji, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1853 days.

(21) Appl. No.: 11/677,766

(22) Filed: Feb. 22, 2007

(65) Prior Publication Data

US 2007/0211661 A1 Sep. 13, 2007

Related U.S. Application Data

(60) Provisional application No. 60/780,025, filed on Mar. 7, 2006.

(51) Int. Cl.
*H04J 11/00* (2006.01)
*H04W 4/00* (2009.01)

(52) U.S. Cl.
USPC ................ 370/208; 370/329; 370/343

(58) Field of Classification Search
None
See application file for complete search history.

(56) References Cited

U.S. PATENT DOCUMENTS

| | | | |
|---|---|---|---|
| 5,537,407 A * | 7/1996 | Park et al. ............. | 370/314 |
| 7,496,113 B2 * | 2/2009 | Cai et al. ............. | 370/474 |
| 2003/0072255 A1* | 4/2003 | Ma et al. ............. | 370/208 |
| 2007/0097897 A1* | 5/2007 | Teague et al. ......... | 370/312 |
| 2009/0213788 A1* | 8/2009 | Prakash et al. ........ | 370/328 |

* cited by examiner

*Primary Examiner* — Steven H Nguyen

(57) ABSTRACT

A method for generating a superframe preamble for a superframe in an orthogonal frequency division multiplexing network is provided. The superframe preamble comprises a plurality of symbols. For a first one of the symbols, a first set of subcarriers of a carrier is allocated to a first broadcast channel, with the first set of subcarriers distributed over substantially the entire carrier. For the first one of the symbols, a second set of subcarriers of the carrier is allocated to a second broadcast channel.

20 Claims, 8 Drawing Sheets

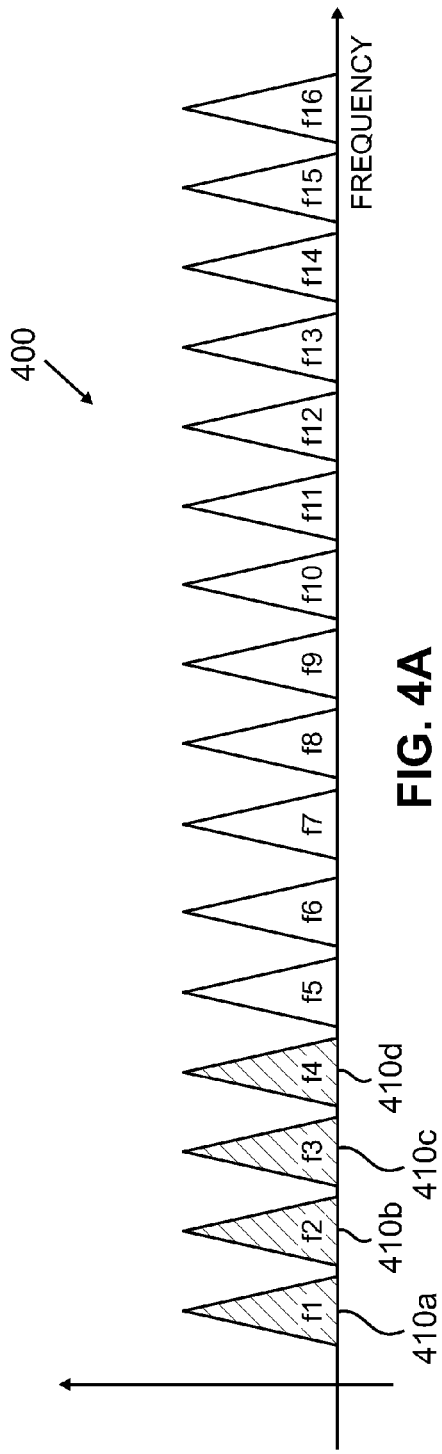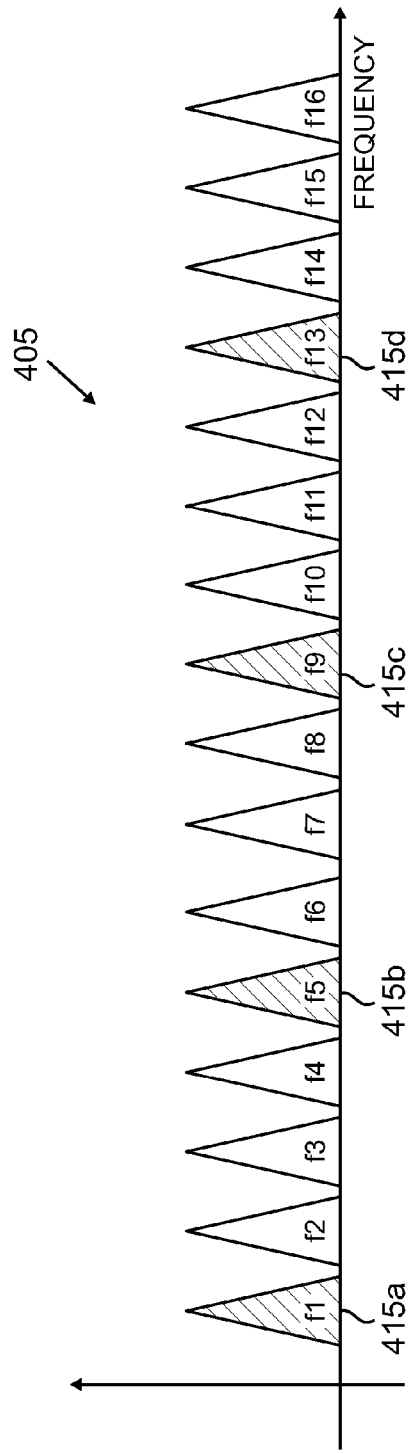

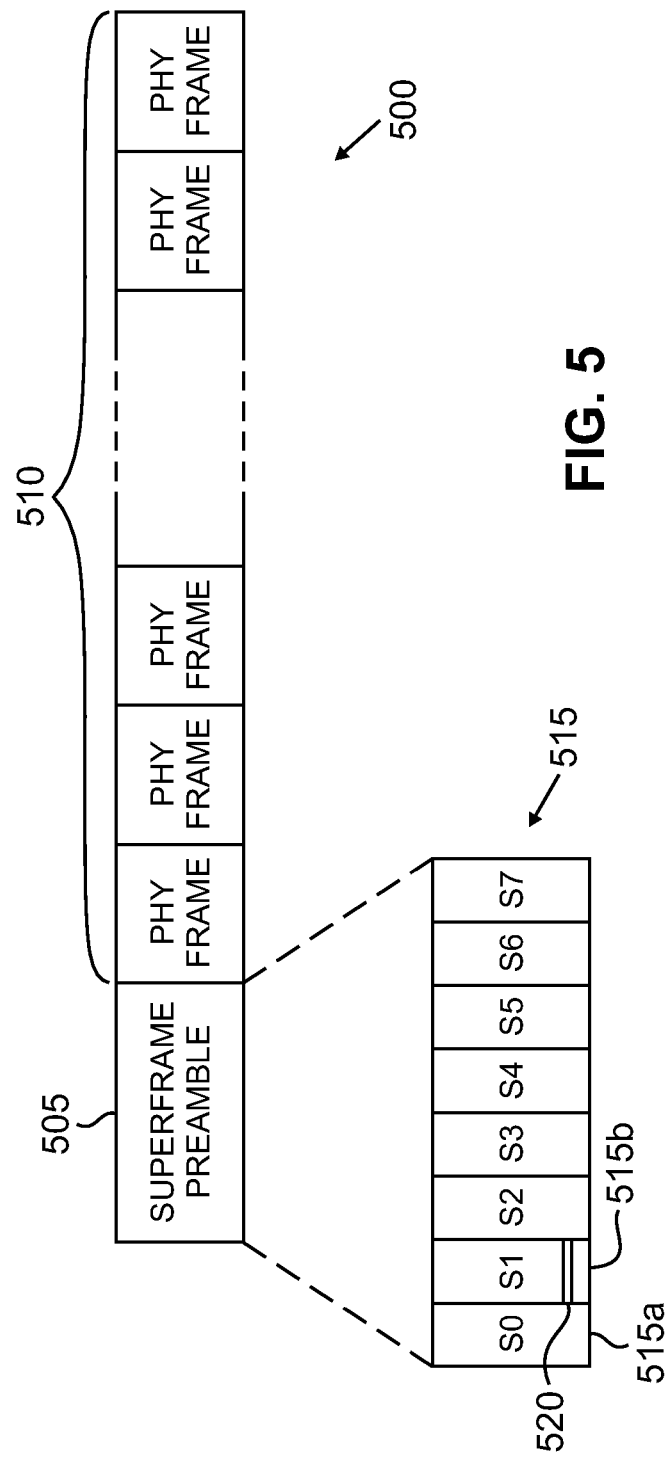

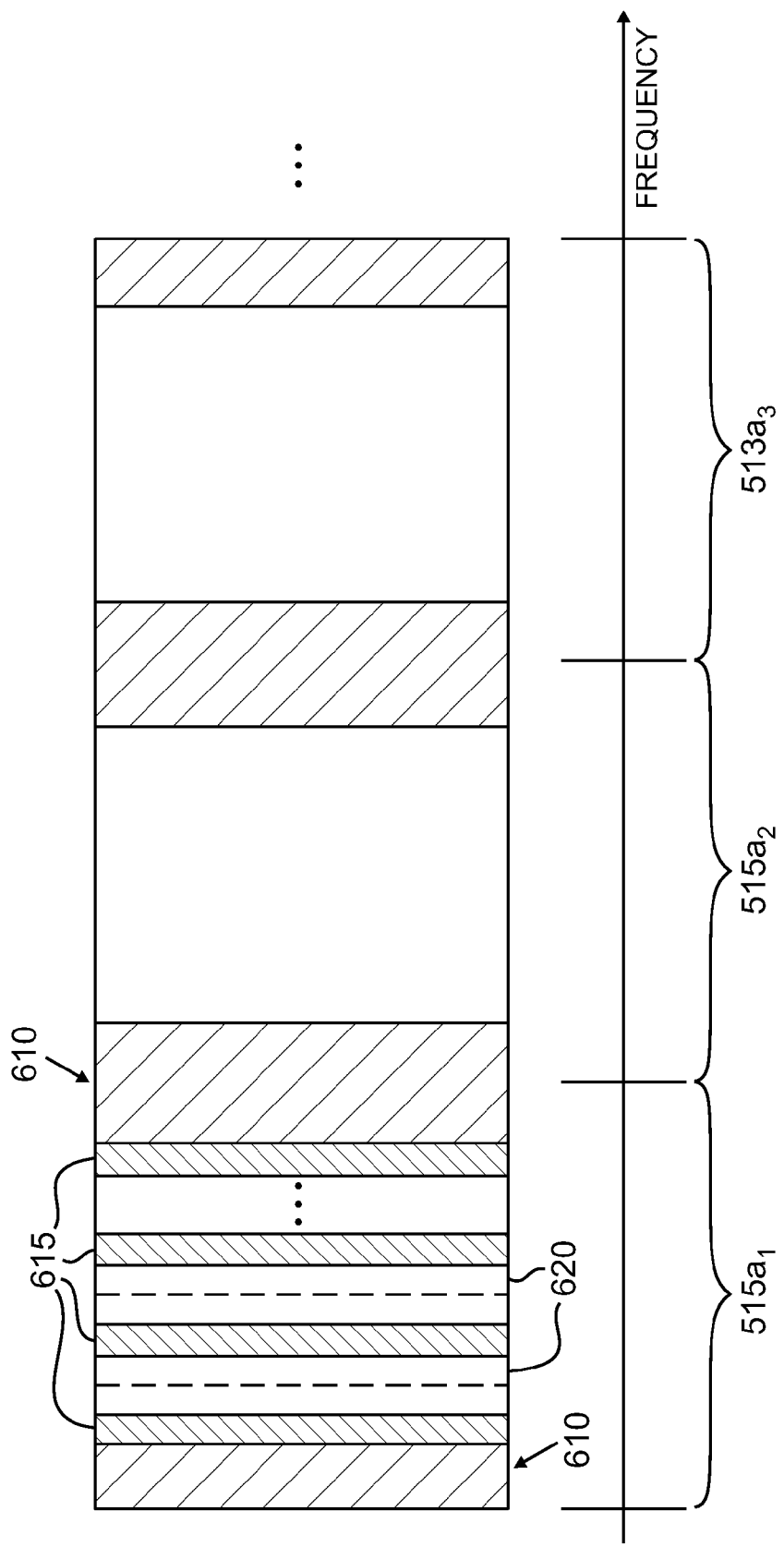

METHOD AND SYSTEM FOR GENERATING A SUPERFRAME PREAMBLE IN AN ORTHOGONAL FREQUENCY DIVISION MULTIPLEXING NETWORK

CROSS-REFERENCE TO RELATED APPLICATIONS AND CLAIM OF PRIORITY

The present application is related to U.S. Provisional Patent No. 60/780,025, filed Mar. 7, 2006, titled "Primary Broadcast Channel Design with Frequency Diversity Gain." U.S. Provisional Patent No. 60/780,025 is assigned to the assignee of the present application and is hereby incorporated by reference into the present disclosure as if fully set forth herein. The present application hereby claims priority under 35 U.S.C. §119(e) to U.S. Provisional Patent No. 60/780,025.

TECHNICAL FIELD OF THE INVENTION

The present application relates generally to wireless communication networks and, more specifically, to a method and system for generating a superframe preamble in an orthogonal frequency division multiplexing network.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to frequency selective fading and multipath effects. An orthogonal frequency division multiple access (OFDMA) system allows some subcarriers to be assigned to different subscriber stations, rather than to a single subscriber station. Today, OFDM and OFDMA technology are used in both wireline transmission systems, such as asymmetric digital subscriber line (ADSL), and wireless transmission systems, such as IEEE-802.11a/g (i.e., WiFi), IEEE-802.16 (e.g., WiMAX), digital audio broadcast (DAB), and digital video broadcast (DVB). This technology is also used for wireless digital audio and video broadcasting.

In some OFDM networks, two primary broadcast channels are used to provide system information, quick page and superframe control information from a base station to subscriber stations. Proposed base station designs assign consecutive subcarriers within two symbols of a superframe preamble to each of the broadcast channels. Because of this, when a subscriber station is in a frequency-selective channel environment, most of the data transmitted in the contiguous subcarriers may be lost when that part of the spectrum is in deep fade. In addition, subscriber stations are required to demodulate the data in both broadcast channels for each superframe, even though the data may remain unchanged. Therefore, there is a need in the art for an improved method for generating a superframe preamble in an OFDM network.

SUMMARY OF THE INVENTION

A method for generating a superframe preamble for a superframe in an OFDM network is provided. The superframe preamble comprises a plurality of symbols. According to an advantageous embodiment of the present disclosure, the method includes, for a first one of the symbols, allocating a first set of subcarriers of a carrier to a first broadcast channel, with the first set of subcarriers distributed over substantially the entire carrier. For the first one of the symbols, a second set of subcarriers of the carrier is allocated to a second broadcast channel.

According to another embodiment of the present disclosure, a method for generating a superframe preamble for a superframe in an OFDM network is provided. The method includes determining whether first broadcast channel data for a subsequent superframe group has changed with respect to first broadcast channel data for a previous superframe group. A change indicator is set in the superframe preamble to indicate whether the first broadcast channel data for the subsequent superframe group has changed with respect to the first broadcast channel data for the previous superframe group.

According to yet another embodiment of the present disclosure, a superframe generator is provided in a base station in an OFDM network. The superframe generator comprises a preamble generator that is operable to generate a superframe preamble for a superframe. The superframe preamble comprises a plurality of symbols. The preamble generator is operable to generate the superframe preamble by (i) for a first one of the symbols, allocating a first set of subcarriers of a carrier to a first broadcast channel, with the first set of subcarriers distributed over substantially the entire carrier, and (ii) for the first one of the symbols, allocating a second set of subcarriers of the carrier to a second broadcast channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A-B illustrate subcarrier allocation for a portion of a preamble symbol by the base station of FIG. 3 according to two embodiments;

FIG. 5 illustrates a superframe structure for a superframe generated by the base station of FIG. 3 according to an embodiment of the present disclosure;

FIG. 6 illustrates details of a first preamble symbol of the superframe of FIG. 5 according to an embodiment of the disclosure.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
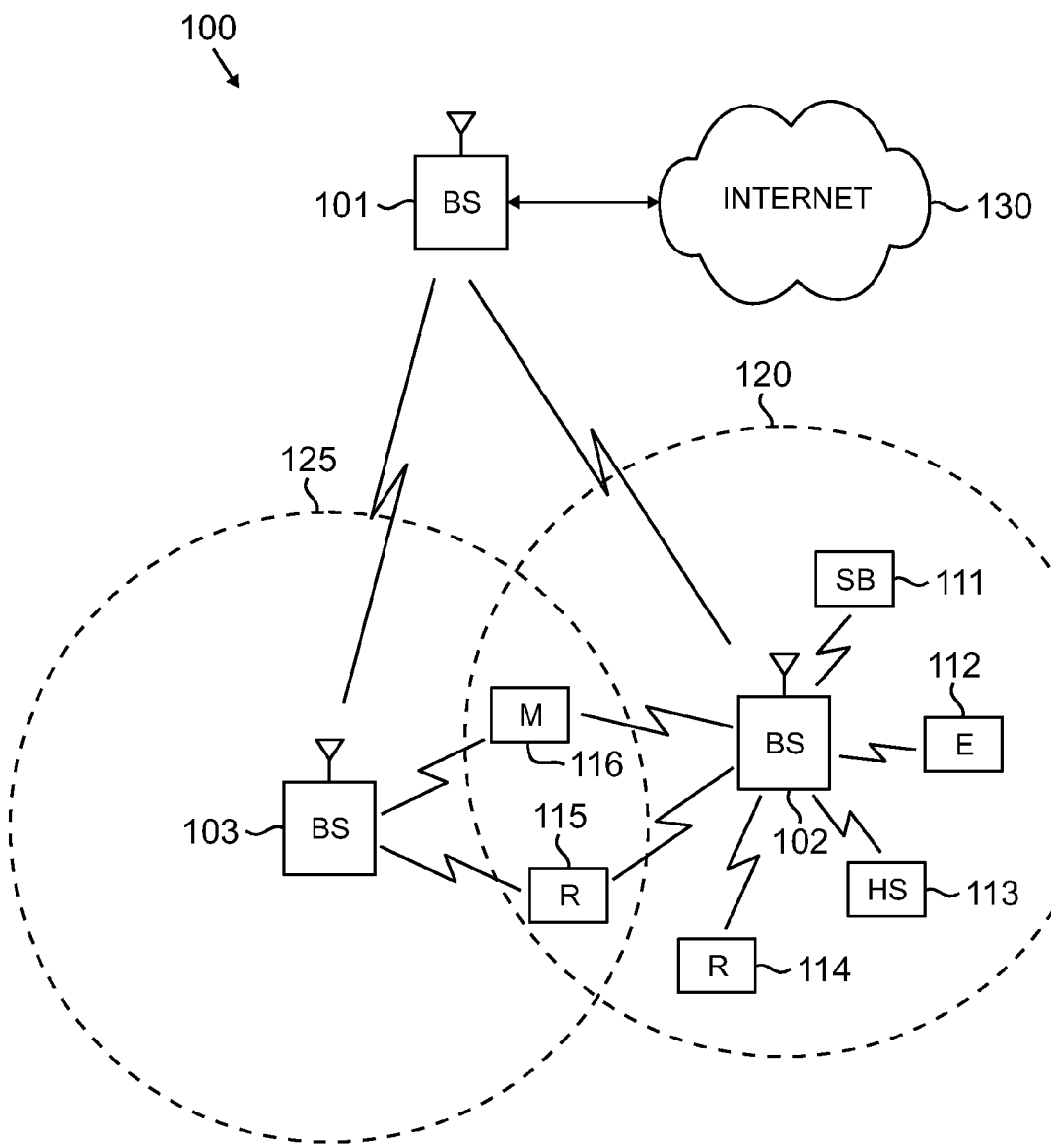
FIG. 1 illustrates a wireless network including base stations capable of generating superframe preambles according to one embodiment of the disclosure.

FIG. 1 illustrates a wireless network 100 comprising base stations capable of generating superframe preambles according to one embodiment of the disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.20 mobile broadband wireless access standard. In another embodiment, an IEEE-802.16 wireless metropolitan area network standard, such as, for example, an IEEE-802.16e standard may be employed. In yet another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

As described in more detail below, one or more of base stations 101-103 may be operable to generate superframe preambles by allocating subcarriers in a symbol that carries system and sector deployment information using a frequency diversity approach. Similarly, subscriber stations 111-116 may be operable to decode the system and sector information based on this allocation. Thus, the system and sector information is distributed over the preamble symbol instead of being provided in contiguous subcarriers of the preamble symbol. As a result, when a subscriber station 111-116 is in a frequency-selective channel environment, system and/or sector information that may have been lost if transmitted in contiguous subcarriers when that part of the spectrum is in deep fade may instead be successfully decoded.

Furthermore, the base stations 101-103 may be operable to provide a change indicator in the preamble to subscriber stations 111-116 to indicate whether the system information has changed. Similarly, subscriber stations 111-116 may be operable to determine whether to decode the system information or not based on the change indicator. Thus, subscriber stations 111-116 need not demodulate the system information for superframes in which the system information remains the same. This reduces the amount of signal processing and battery consumption at the subscriber stations.

Figure 2A:
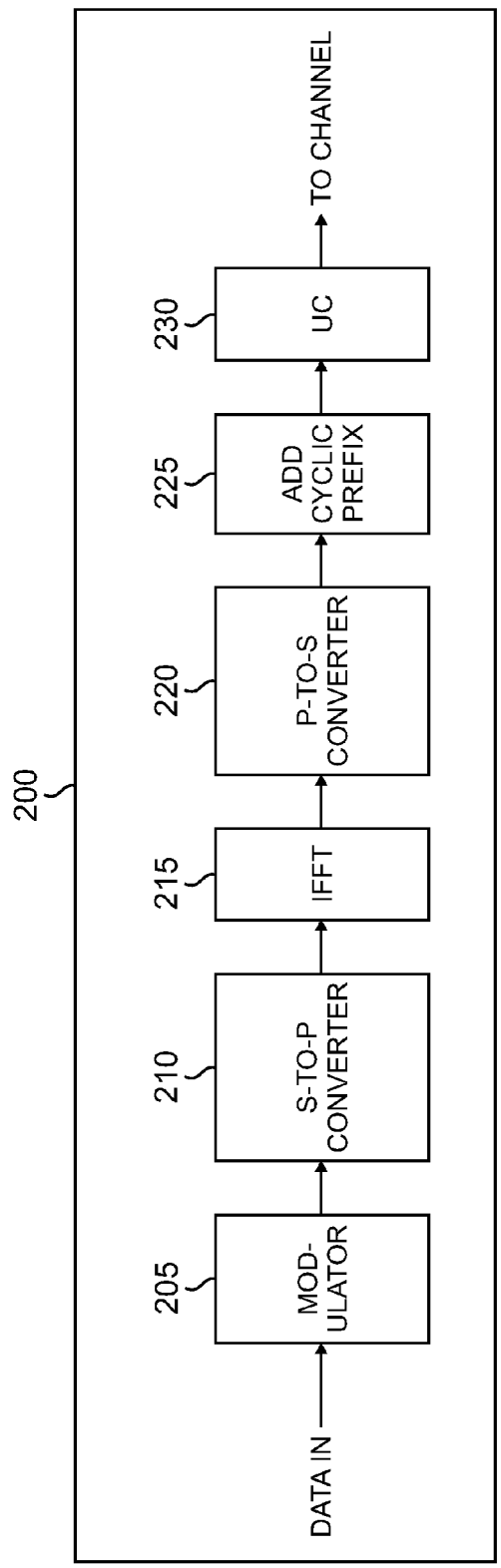
FIGS. 2A-B are block diagrams of an orthogonal frequency division multiple access (OFDMA) transmitter and an OFDMA receiver, respectively, according to an embodiment of the disclosure.
Figure 2B:
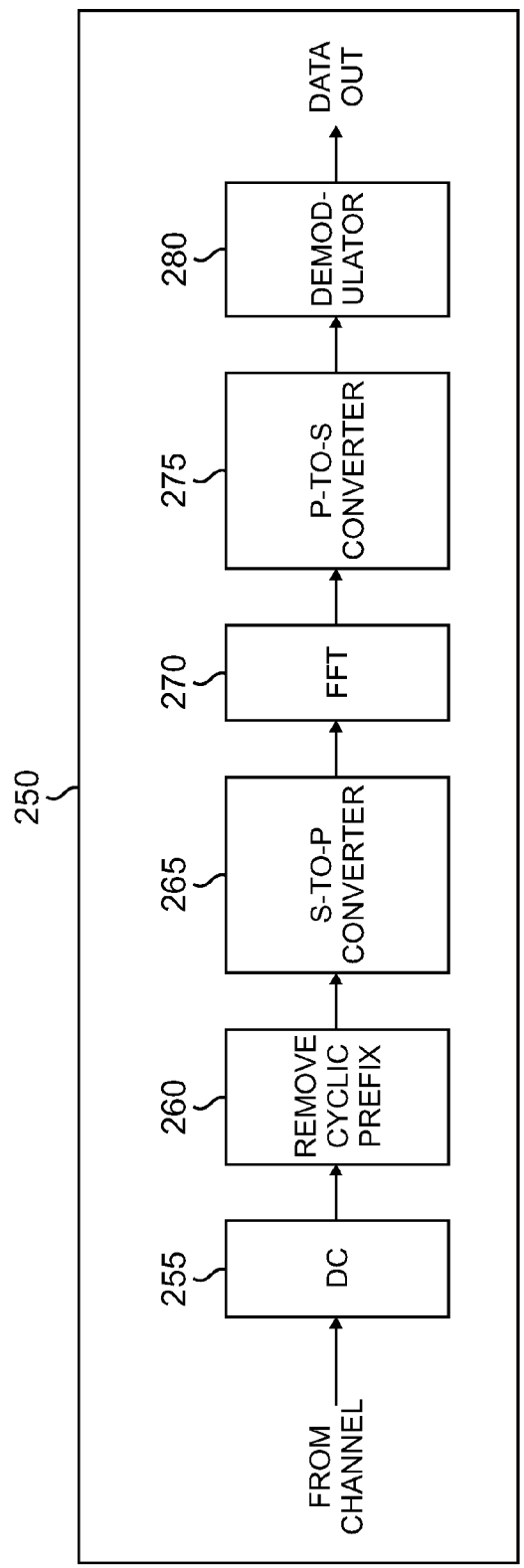

FIG. 2A is a block diagram of orthogonal frequency division multiple access (OFDMA) transmitter 200. FIG. 2B is a block diagram of OFDMA receiver 250. OFDMA transmitter 200 or OFDMA receiver 250, or both, may be implemented in any of base stations 101-103 of wireless network 100. Similarly, OFDMA transmitter 200 or OFDMA receiver 250, or both, may be implemented in any of subscriber stations 111-116 of wireless network 100.

OFDMA transmitter 200 comprises a modulator 205, a serial-to-parallel (S-to-P) converter 210, an Inverse Fast Fourier Transform (IFFT) block 215, a parallel-to-serial (P-to-S) converter 220, an add cyclic prefix block 225, and an up-converter (UC) 230. OFDMA receiver 250 comprises a down-converter (DC) 255, a remove cyclic prefix block 260, a serial-to-parallel (S-to-P) converter 265, a Fast Fourier Transform (FFT) block 270, a parallel-to-serial (P-to-S) converter 275, and a demodulator 280. For one embodiment, modulator 205 comprises a quadrature amplitude modulation (QAM) modulator and demodulator 280 comprises a QAM demodulator. Alternatively, modulator 205 may comprise a BPSK, QPSK or 8PSK modulator and demodulator 280 may comprise a BPSK, QPSK or 8PSK demodulator. It will be understood that transmitter 200 and/or receiver 250 may comprise additional components not illustrated in FIGS. 2A and 2B without departing from the scope of the present disclosure.

At least some of the components in FIGS. 2A and 2B may be implemented in software while other components may be implemented by configurable hardware or a mixture of software and configurable hardware. In particular, it is noted that the IFFT block 215 and the FFT block 270 described in this disclosure may be implemented as configurable hardware or software algorithms. These blocks 215 and 270 may each have a corresponding size of N and the value of N may be modified according to the implementation.

Furthermore, although the present disclosure is directed to an embodiment that implements the Fast Fourier Transform (FFT) and the Inverse Fast Fourier Transform (IFFT), this is by way of illustration only and should not be construed so as to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of N may be any integer number (i.e., 1, 2, 3, 4, etc.), while for FFT and IFFT functions, the value of N may be any integer number that is a power of two (i.e., 1, 2, 4, 8, 16, etc.).

In OFDMA transmitter 200 for one embodiment, modulator 205 receives a set of information bits, encodes and modulates the input bits to produce a sequence of frequency-domain modulation symbols. Modulator 205 modulates the input bits using modulation and coding that may be selected based on the link quality, data rate requirement, or ranks determined by the receiver 250, as described in more detail below. Serial-to-parallel converter 210 converts (e.g., de-multiplexes) the serial symbols to parallel data, thereby producing N parallel symbol streams (where N is the IFFT/FFT size used in transmitter 200 and receiver 250). IFFT block 215 then performs an IFFT operation on the N parallel symbol streams to produce time-domain output signals. Parallel-to-serial converter 220 converts (e.g., multiplexes) the parallel time-domain output symbols from IFFT block 215 to produce a serial time-domain signal. Add cyclic prefix block 225 then adds a cyclic prefix onto the time-domain signal. In an advantageous embodiment, add cyclic prefix block 225 may be followed by a windowing or filtering block (not shown) to shape the transmit signal and limit the out-of-band spectral emissions.

Finally, up-converter 230 up-converts the output of add cyclic prefix block 225 to RF frequency for transmission via the forward channel or reverse channel, depending on whether OFDMA transmitter 200 is implemented in a base station or a subscriber station. The signal from add cyclic prefix block 225 may also be filtered at baseband before conversion to RF frequency. The time-domain signal transmitted by OFDMA transmitter 200 comprises multiple overlapping sinusoidal signals, which are orthogonal to each other, corresponding to the data symbols transmitted.

In OFDMA receiver 250, an incoming RF signal is received from the forward channel or reverse channel, depending on whether OFDMA receiver 250 is implemented in a subscriber station or a base station. OFDMA receiver 250 reverses the operations performed in OFDMA transmitter 200. Down-converter 255 down-converts the received signal to baseband frequency and remove cyclic prefix block 260 removes the cyclic prefix to produce the serial time-domain baseband signal. Serial-to-parallel converter 265 converts the time-domain baseband signal samples to parallel time-domain signal samples. FFT block 270 then performs an FFT algorithm to produce N parallel frequency-domain signal samples. Parallel-to-serial converter 275 converts the parallel frequency-domain signal samples to a sequence of data symbols. Demodulator 280 then demodulates and decodes the symbols to recover the original input data stream.

Figure 3:
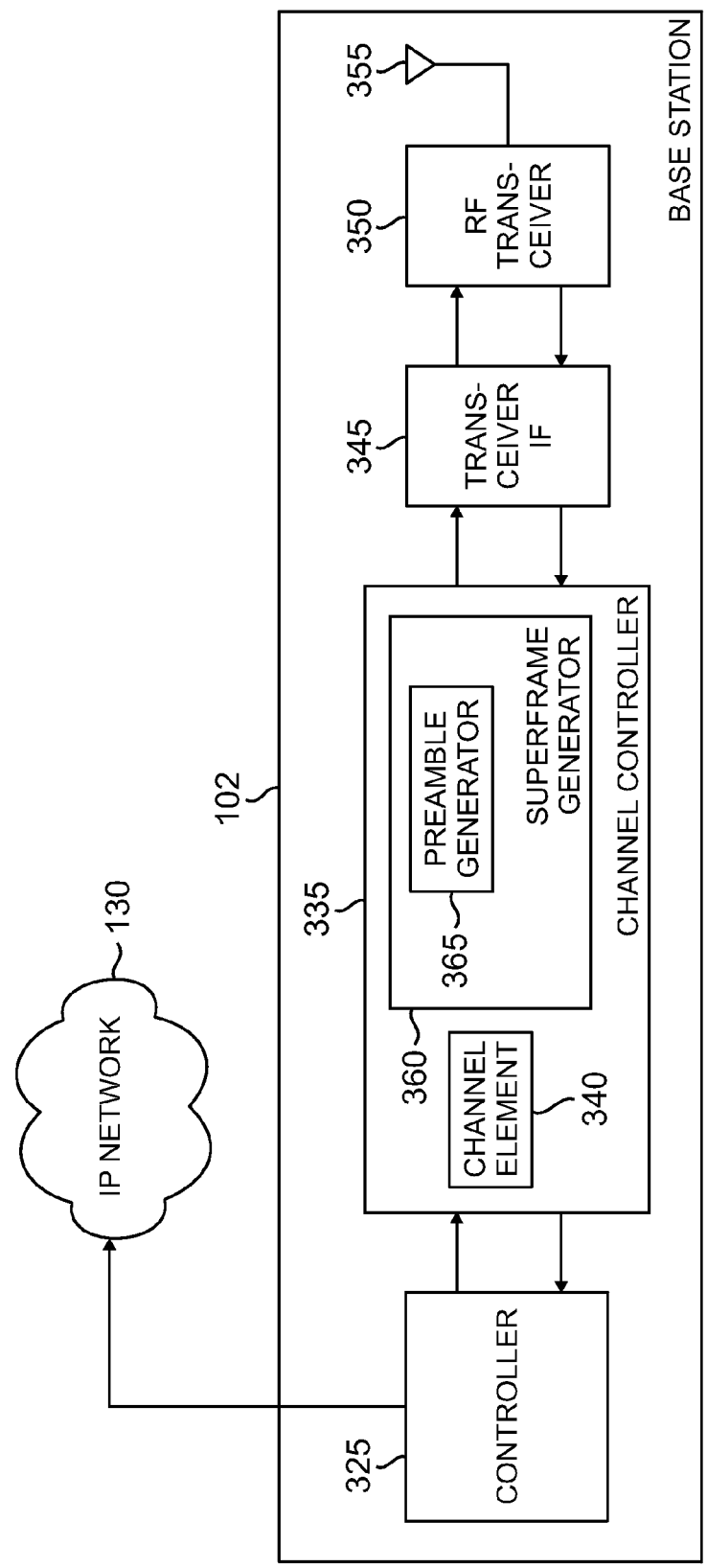
FIG. 3 illustrates a base station that is capable of generating a superframe preamble according to an embodiment of the present disclosure.

FIG. 3 illustrates base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 325, channel controller 335, transceiver interface (IF) 345, radio frequency (RF) transceiver unit 350, and antenna array 355.

Controller 325 comprises processing circuitry and memory capable of executing an operating program that controls the overall operation of base station 102. In an embodiment, controller 325 may be operable to communicate with network 130. Under normal conditions, controller 325 directs the operation of channel controller 335, which comprises a number of channel elements, such as exemplary channel element 340, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 340 also preferably performs all baseband processing, including processing any digitized received signal to extract the information or data bits conveyed in the received signal, typically including demodulation, decoding, and error correction operations, as known to those of skill in the art. Transceiver IF 345 transfers bidirectional channel signals between channel controller 335 and RF transceiver unit 350.

Antenna array 355 transmits forward channel signals received from RF transceiver unit 350 to subscriber stations 111-116 in the coverage area of base station 102. Antenna array 355 is also operable to send to RF transceiver unit 350 reverse channel signals received from subscriber stations 111-116 in the coverage area of the base station 102. According to one embodiment of the present disclosure, antenna array 355 may comprise a multi-sector antenna, such as a three-sector antenna in which each antenna sector is responsible for transmitting and receiving in a coverage area corresponding to an arc of approximately 120 degrees. Additionally, RF transceiver unit 350 may comprise an antenna selection unit to select among different antennas in antenna array 355 during both transmit and receive operations.

In accordance with an embodiment of the present disclosure, channel controller 335 comprises superframe generator 360, which comprises preamble generator 365. Superframe generator 360 is operable to generate superframes to send to subscriber stations 111-116. In OFDM networks such as wireless network 100, superframe generator 360 uses a first primary broadcast channel (i.e., F-pBCH0) to provide system information to subscriber stations 111-116 and a second primary broadcast channel (i.e., F-pBCH1) to provide quick page and other control information to subscriber stations 111-116. By way of example, the current IEEE-802.20 standard specifies the following information to be carried by the second primary broadcast channel: 1) load control; 2) power offset between the reverse link (RL) control channel and the traffic channel; 3) power offset between RL control channel and the ACK channel; and 4) quick Page block or quick channel information block, where the latter comprises information on the system configuration, (e.g., number of pilots, pilot pattern, number of subbands, antenna configurations, hopping pattern, etc.).

In accordance with the IEEE 802.20 standards draft V1.0, the broadcast channels are carried by a superframe preamble. The first broadcast channel comprises encoded, interleaved system information, such as length of cyclic prefix, number of guard subcarriers and the like. Modulated data in this first broadcast channel is transmitted over a plurality of superframes in which the first broadcast channel data remains unchanged. Based on the IEEE 802.20 standard, the size of this superframe group is 16 superframes. Each following group of superframes may provide the same or different data in the first broadcast channel, but the data does not change within the superframe group.

The first broadcast channel data may be provided within a first OFDM symbol of the superframe preamble, while data for the second broadcast channel may be provided within the first symbol and also within a second symbol. For one embodiment, about ¼ of the subcarriers available in the first symbol for a particular carrier may be used to modulate the first broadcast channel data, leaving about ¾ of the subcarriers in the first symbol available for modulating the second broadcast channel data.

Preamble generator 365 is operable to generate the superframe preamble by distributing the first broadcast channel data over a subset of subcarriers that spans substantially over all of the subcarriers, instead of allocating contiguous subcarriers to modulate the first broadcast channel data. In addition, by using the remaining subcarriers to modulate a portion of the second broadcast channel data, preamble generator 365 is also operable to distribute the second broadcast channel data over a subset of subcarriers that spans substantially over all of the subcarriers in the first symbol. Thus, in a frequency-selective channel environment, generating the superframe preamble in this manner provides frequency diversity gain that increases the robustness of both broadcast channels.

In addition, as described in more detail below, preamble generator 365 is operable to provide a change indicator in the superframe preamble to indicate to subscriber stations 111-116 when the first broadcast channel data has changed from one superframe group to the next. Thus, when the change indicator does not indicate a change, subscriber stations 111-116 do not need to demodulate the data for the first broadcast channel, thereby reducing power consumption and increasing efficiency.

Therefore, for a particular embodiment, in order to implement the described base station 102, steps 3 and 4 in section 9.3.2.4.3.1 of the standards draft V1.0 for IEEE 802.20 may be modified as follows:

3) If the subcarrier in step (2) is a pilot subcarrier, then increment j and repeat step (2); otherwise, increment j by D_bch, i.e., j≥j+D_bch, where D_bch is the number of subcarriers between adjacent subcarriers that carry F-pBCH0 modulated symbols; j is the subcarrier index in the carrier.

4) If j>(N_carrier_size-N_guard, PR/2), increment i and set j=N_guard, PR/2, where i is the superframe index, N_carrier_size is the total number of subcarriers, and N_guard, PR is the number of guard subcarriers in the preamble.

As the second broadcast channel (F-pBCH1) shares the first preamble symbol (Symbol 0) with the first broadcast channel (F-pBCH0), the corresponding steps for modulating the second broadcast channel may be modified as described below. As a result, the second broadcast channel would also be able to achieve some additional frequency diversity gain. The modification may include replacing steps 1-5 in section 9.3.2.4.3.2 of the standards draft V1.0 for IEEE 802.20 by the following statement:

With the identified subcarrier indices that are pilot subcarriers, which are assigned as described in section 9.3.2.4.2, and those that are modulated with F-pBCH0 as described above, F-pBCH1 data symbols will be modulated onto the rest of the usable subcarriers in Symbol 0.

FIG. 4A illustrates subcarrier allocation for a portion of a preamble symbol by base station 102 using contiguous allocation 400, and FIG. 4B illustrates subcarrier allocation for a portion of a preamble symbol by base station 102 using frequency diversity allocation 405. The portion illustrated in FIGS. 4A and 4B comprises only sixteen subcarriers. It will be understood that the entire symbol may comprise any number of subcarriers, such as 512, 1024 or any other suitable number.

As described above, the symbol may comprise a first symbol in a superframe preamble that is operable to provide the first broadcast channel data and a portion of the second broadcast channel data. In the case of contiguous allocation 400 such as that used in existing wireless networks, a contiguous set of subcarriers 410a-d is allocated for transmitting the first broadcast channel data to a subscriber station. The total bandwidth is divided into two sub-bands grouping multiple contiguous subcarriers, as shown in FIG. 4A where subcarriers $f_1$, $f_2$, $f_3$ and $f_4$ 410a-d are grouped into a sub-band for transmitting data on the first broadcast channel and the remaining subcarriers $f_5$-$f_{16}$ are grouped into a sub-band for transmitting data on the second broadcast channel. However, in the case of frequency diversity allocation 405 such as that used by preamble generator 365 operating in the proposed wireless network 100, the allocated subcarriers 415a-d for transmitting data on the first broadcast channel are distributed over the whole spectrum, as is shown in FIG. 4B. In addition, the remaining subcarriers that are allocated for transmitting data on the second broadcast channel are also distributed over the whole spectrum.

While subcarriers for the broadcast channels that are allocated using contiguous allocation 400 cannot take advantage of frequency diversity gain, subcarriers allocated using frequency diversity allocation 405 are able to take advantage of frequency diversity gain. As the broadcast channels carry important system and sector information, any additional gain is desirable as it increases the robustness of the channels, especially for subscriber stations 111-116 that are located at cell boundaries. When the subcarriers are distributed across the spectrum, a much smaller percentage of the data may be lost and this lost data may possibly be corrected by the decoder.

Although the illustrated embodiment of frequency diversity allocation 405 includes one subcarrier 415 for the first broadcast channel for each four subcarriers, it will be understood that the subcarriers 415 for the first broadcast channel may be allocated in any suitable manner that distributes the data over substantially all the subcarriers without departing from the scope of the disclosure. For example, the subcarriers 415 may be distributed uniformly over all the subcarriers but at different intervals, such as one subcarrier 415 for every eight subcarriers or such as two or more contiguous subcarriers 415 at uniform intervals. For another example, the subcarriers 415 may be distributed almost uniformly over all the subcarriers at any suitable intervals, such as every seventh, eighth or ninth subcarrier. For yet another example, the subcarriers 415 may be distributed non-uniformly over all the subcarriers, based on a pre-determined pattern.

FIG. 5 illustrates a superframe structure for a superframe 500 generated by superframe generator 360 of base station 102 according to an embodiment of the present disclosure. Superframe 500 comprises a superframe preamble 505 generated by preamble generator 365 and a plurality of physical layer (PHY) frames 510. Although illustrated contiguously without separation, it will be understood that the PHY frames 510 may be separated for time-division duplexing. For one embodiment, superframe 500 may comprise 24 PHY frames 510. However, it will be understood that superframe 500 may comprise any suitable number of PHY frames 510.

Superframe preamble 505 comprises a plurality of symbols 515. Although illustrated with eight symbols 515, it will be understood that superframe preamble 505 may comprise any suitable number of symbols 515. As illustrated and described in more detail in connection with FIG. 6, a first symbol (Symbol 0) 515a comprises the first broadcast channel data and a portion of the second broadcast channel data. A second symbol (Symbol 1) 515b comprises the remaining second broadcast channel data.

For one embodiment, second broadcast channel data comprises a change indicator 520 that is operable to indicate that the first broadcast channel data has changed or will change in a specified future superframe group. Although illustrated in second symbol 515b, it will be understood that change indicator 520 may be provided in first symbol 515a. For one embodiment, change indicator 520 comprises a SysInfoDelta bit in second broadcast channel data. For this embodiment, the SysInfoDelta bit may be set to a 1 when the first broadcast channel data has changed or will change and set to a 0 otherwise, or vice versa. For a particular embodiment, the SysInfoDelta bit may be sent in the physical layer channel of the second broadcast channel, per Section 7.2.6.1 of IEEE P802.20/D1, January 2006, in a reserved bit.

Using a change indicator 520 in superframe preamble 505 in this manner, a subscriber station 111-116 need not decode the first broadcast channel unless the deployment information of the system changes after the subscriber station 111-116 finishes an initialization process. Therefore, mobile processing time is reduced, resulting in an increase in battery life.

FIG. 6 illustrates details of the first symbol 515a of the superframe 500 according to an embodiment of the disclosure. The illustrated embodiment shows a first symbol $515a_{1, 2, 3}$ for each of three carriers, with each symbol $515a_{1, 2, 3}$ separated from the others by guard subcarriers 610. For the following description, the first symbol $515a_1$ is described for the first carrier.

The first symbol $515a_1$ comprises a plurality of first broadcast channel subcarriers 615 that are distributed across substantially the entire first carrier. Although illustrated as uniformly distributed, it will be understood that the first broadcast channel subcarriers 615 may be distributed in any other suitable manner, as described above in connection with FIG. 4.

The first symbol $515a_1$ also comprises a plurality of second broadcast channel subcarriers 620 that are also distributed across substantially the entire first carrier. Thus, instead of using a group of contiguous first broadcast channel data subcarriers 615 and another group of contiguous second broadcast channel data subcarriers 620, both sets of subcarriers 615 and 620 are distributed to take advantage of frequency diversity gain.

Figure 7:
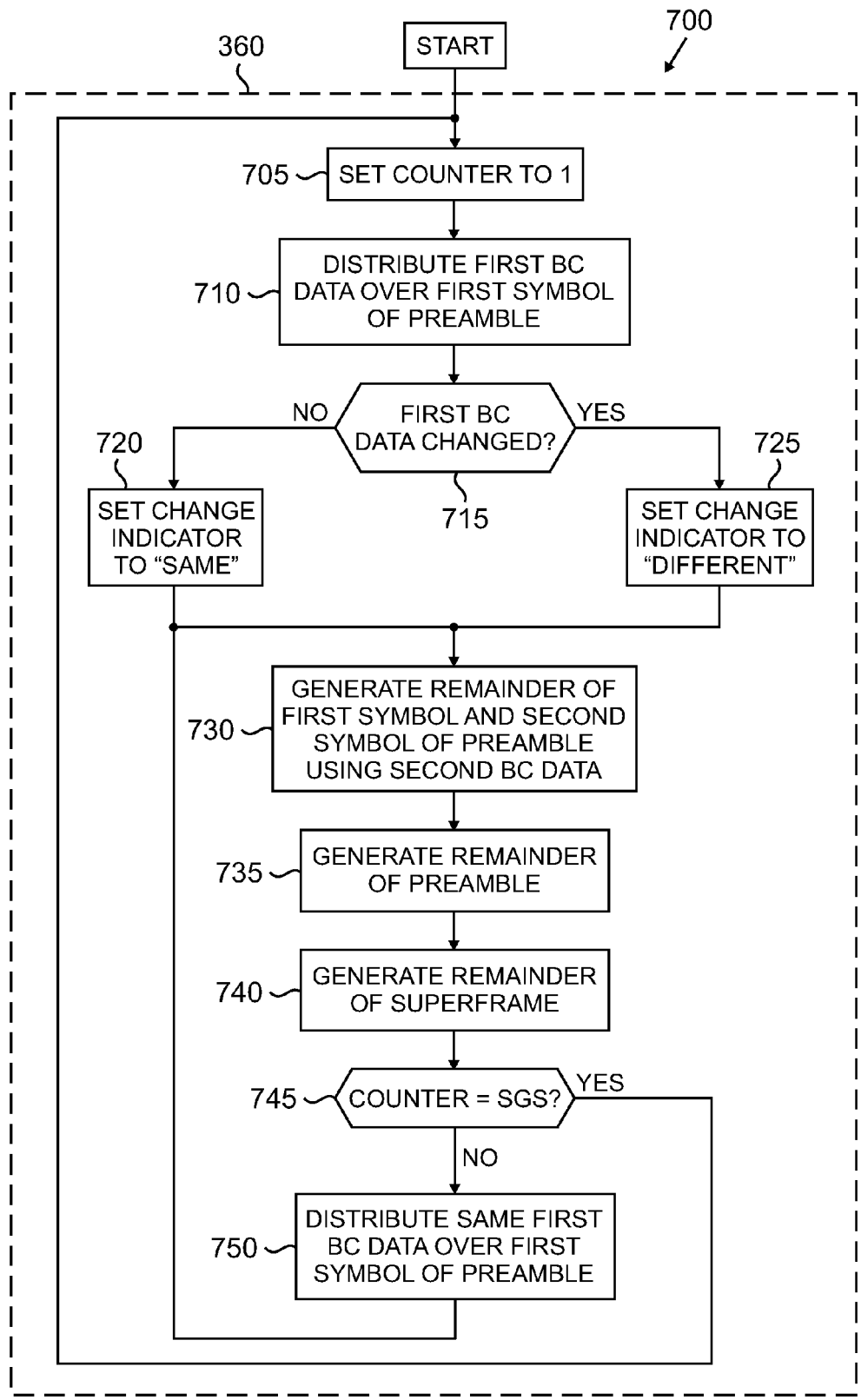
FIG. 7 is a flow diagram illustrating a method for generating a superframe preamble in the base station of FIG. 3 according to an embodiment of the disclosure.

FIG. 7 is a flow diagram illustrating a method 700 for generating a superframe preamble 505 in base station 102 according to an embodiment of the disclosure. Initially, preamble generator 365 sets a counter to 1 (process step 705). The counter is operable to keep track of the number of superframes generated within a particular superframe group.

Preamble generator 365 distributes first broadcast channel (BC) data over a first symbol 515a of a superframe preamble 505 (process step 710). Preamble generator 365 makes a determination as to whether or not the first broadcast channel data has changed since the previous superframe group (or will change in a specified superframe group, as described above in connection with FIG. 5) (process step 715).

If the first broadcast channel data has not changed (or will not change) (process step 715), preamble generator 365 sets a change indicator 520 in superframe preamble 505 to "same," indicating that the data is the same (process step 720). For example, for one particular embodiment, preamble generator 365 sets a SysInfoDelta bit in second broadcast channel data to 0. However, if the first broadcast channel data has changed (or will change) (process step 715), preamble generator 365 sets the change indicator 520 to "different," indicating that the data is (or will be) different (process step 725). For example, for one particular embodiment, preamble generator 365 sets a SysInfoDelta bit in second broadcast channel data to 1.

After setting the change indicator 520 (process step 720 or 725), preamble generator 365 generates the remainder of the first symbol 515a and generates a second symbol 515b of the preamble using data for the second broadcast channel (process step 730). For example, preamble generator 365 distributes a portion of the second broadcast channel data over the portion of the first symbol 515a unused by the first broadcast channel data and provides the remaining portion of the second broadcast channel data in the second symbol 515b.

Preamble generator 365 generates the remainder of superframe preamble 505 in any suitable manner (process step 735). Superframe generator 360 then generates the remainder of superframe 500 in any suitable manner (process step 740).

Preamble generator 365 compares the counter value to a superframe group size (SGS) to determine whether there is a possibility that the first broadcast channel data may have changed (process step 745). For example, preamble generator 365 may determine whether 16 superframes have been generated such that the first broadcast channel data may change in a following superframe that is part of a subsequent superframe group.

When the counter value has not yet reached the superframe group size (process step 745), preamble generator 365 distributes the same first broadcast channel data over a first symbol 515a of a subsequent superframe preamble 505 (process step 750). Preamble generator 365 then generates the remainder of the first symbol 515a and generates a second symbol 515b of the preamble using data for the second broadcast channel, which may change from one superframe to the next (process step 730), and the method continues as before.

Once the counter value reaches the superframe group size (process step 745), preamble generator 365 resets the counter to 1 (process step 705), and the method begins again for a subsequent superframe group.

In this way, both primary broadcast channels may take advantage of frequency diversity gain, and this gain may be obtained without an increase in the complexity of the system. In addition, the use of a change indicator 520 in superframe preamble 505 allows subscriber stations 111-116 to avoid decoding the first broadcast channel when the system information remains unchanged. Thus, processing time in subscriber stations 111-116 is reduced, resulting in increased battery life for subscriber stations 111-116.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for generating a superframe preamble for a superframe, the superframe preamble comprising a plurality of symbols, in an orthogonal frequency division multiplexing (OFDM) network, comprising:
   for a first one of the symbols, allocating a first set of subcarriers of a carrier to a first broadcast channel, the first set of subcarriers distributed over substantially the entire carrier; and
   for the first one of the symbols, allocating a second set of subcarriers of the carrier to a second broadcast channel.

2. The method as set forth in claim 1, wherein the first set of subcarriers is distributed uniformly over substantially the entire carrier.

3. The method as set forth in claim 1, wherein the first set of subcarriers is distributed non-uniformly over substantially the entire carrier, according to a pre-determined pattern.

4. The method as set forth in claim 1, wherein the second set of subcarriers is distributed over substantially the entire carrier.

5. The method as set forth in claim 1, further comprising, for a second one of the symbols, allocating substantially all the subcarriers to the second broadcast channel.

6. The method as set forth in claim 1, wherein the first broadcast channel comprises a first primary broadcast channel operable to carry system information, and the second broadcast channel comprises a second primary broadcast channel operable to carry quick Page and control information.

7. The method as set forth in claim 6, further comprising setting a change indicator in the superframe preamble to indicate whether the system information for a subsequent superframe group has changed with respect to a previous superframe group.

8. The method as set forth in claim 7, wherein the subsequent superframe group comprises a first superframe, the first superframe comprising the superframe preamble.

9. The method as set forth in claim 7, wherein the previous superframe group comprises a first superframe, the first superframe comprising the superframe preamble.

10. The method as set forth in claim 7, wherein the change indicator comprises a single bit in the control information.

11. The method as set forth in claim 7, wherein a specified superframe comprises the superframe preamble, the superframe preamble comprising quick page and control information for the specified superframe, the control information for the specified superframe comprising the change indicator.

12. A superframe generator in a base station in an OFDM network, comprising a preamble generator operable to generate a superframe preamble comprising a plurality of symbols for a superframe by (i) for a first one of the symbols, allocating a first set of subcarriers of a carrier to a first broadcast channel, the first set of subcarriers distributed over substantially the entire carrier, and (ii) for the first one of the symbols, allocating a second set of subcarriers of the carrier to a second broadcast channel.

13. The superframe generator as set forth in claim 12, wherein the first set of subcarriers is distributed uniformly over substantially the entire carrier.

14. The superframe generator as set forth in claim 12, wherein the first set of subcarriers is distributed non-uniformly over substantially the entire carrier, according to a pre-determined pattern.

15. The superframe generator as set forth in claim 12, wherein the first broadcast channel comprises a first primary broadcast channel operable to carry system information, and the second broadcast channel comprises a second primary broadcast channel operable to carry quick page and other control information.

16. The superframe generator as set forth in claim 15, wherein the preamble generator is further operable to set a change indicator in the superframe preamble to indicate whether the system information for a superframe group comprising the superframe has changed with respect to a previous superframe group.

17. The superframe generator as set forth in claim 16, wherein the change indicator comprises a single bit.

18. The superframe generator as set forth in claim 16, wherein the second broadcast channel comprises a physical layer channel, the physical layer channel comprising the change indicator.

19. The superframe generator as set forth in claim 15, wherein the preamble generator is further operable to set a change indicator in the superframe preamble to indicate whether the system information for a superframe group comprising the superframe will change in a subsequent superframe group.

20. The superframe generator as set forth in claim 12, wherein the second set of subcarriers is distributed over substantially the entire carrier.

* * * * *